May 15, 1962 G. H. BINGHAM, JR 3,034,158
IMPLEMENT FOR USE IN MAKING FOOTWEAR
Filed July 23, 1959 2 Sheets-Sheet 1
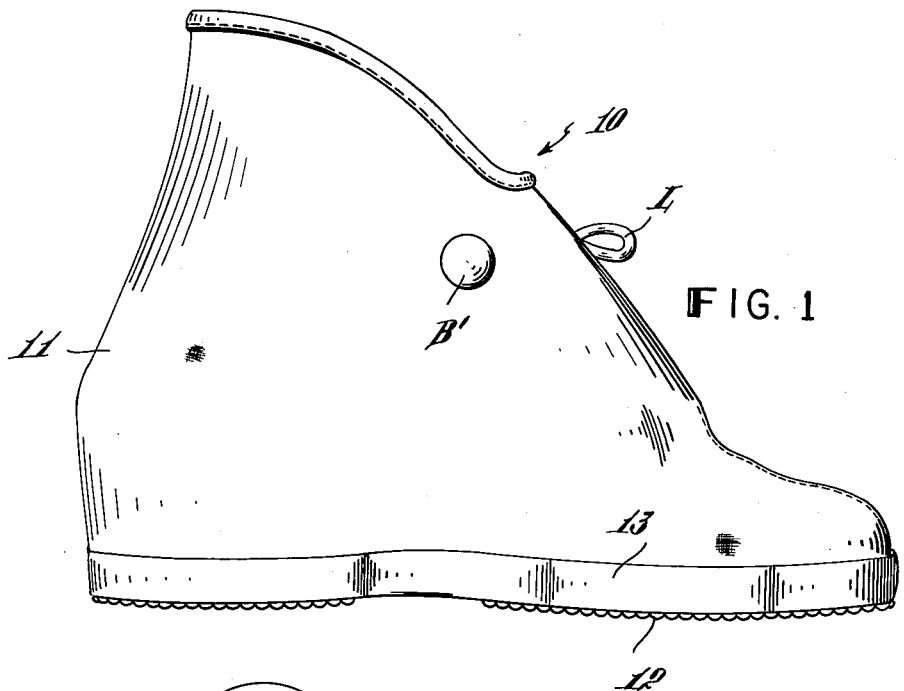
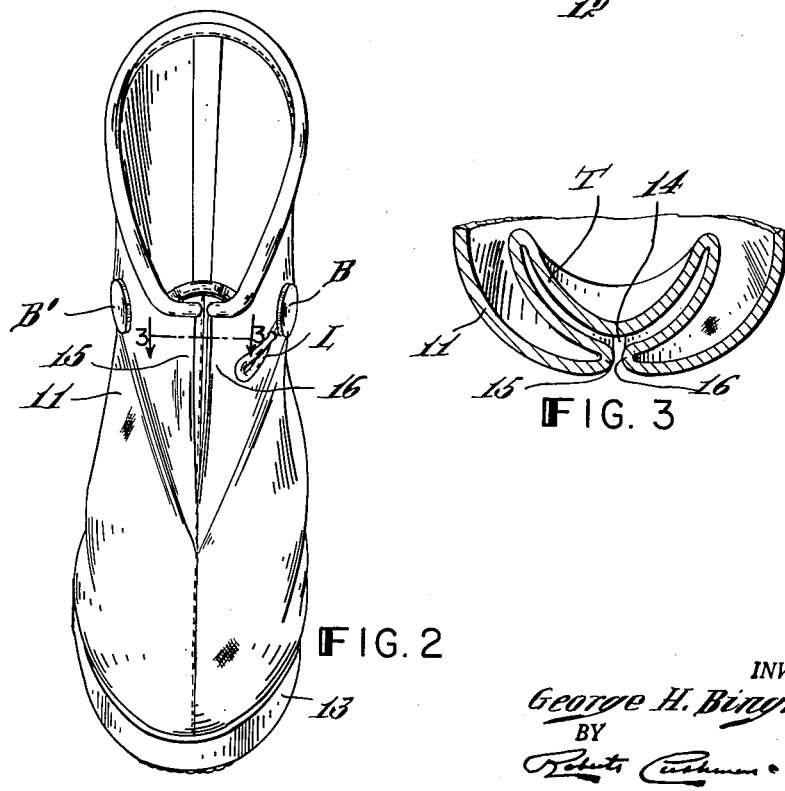
INVENTOR.
George H. Bingham, Jr.
BY
ATT'YS.

May 15, 1962   G. H. BINGHAM, JR   3,034,158
IMPLEMENT FOR USE IN MAKING FOOTWEAR
Filed July 23, 1959   2 Sheets-Sheet 2

INVENTOR.
George H. Bingham, Jr.
BY
ATT'YS.

3,034,158
Patented May 15, 1962

3,034,158
IMPLEMENT FOR USE IN MAKING FOOTWEAR
George H. Bingham, Jr., Westminster, Md., assignor to Cambridge Rubber Company, Taneytown, Md., a corporation of Maryland
Filed July 23, 1959, Ser. No. 829,040
2 Claims. (Cl. 12—103)

This invention pertains to the manufacture of footwear, particularly to overshoes or the like wherein the upper comprises a waterproofing substance, for instance, a rubber compound which, during the final stages of manufacture, is subjected to a treatment whereby it is completely cured or set.

One specific instance of the utility of the invention is in the manufacture of overshoes by the so-called "sock" method wherein the upper, with the innersole attached thereto, either integrally or by fastening elements, is drawn over a metal last provided with heating means and then assembled with an outersole in a suitable mold and subjected to heat and pressure, whereby the several parts are cured and the inner and outer soles permanently united.

A customary style of overshoe made by the above procedure has a throat opening at its front or side, extending downwardly from its upper edge, and this opening is provided with a bellows-type tongue or gore so as to close the opening leak-tight. At each side of this opening the material forms a fold where it merges with the gore. When such an overshoe is not in use, and more particularly when it is on display in a shop window, the tendency of the opposite sides of the opening to spread apart to some extent due to the weight of the material itself, greatly detracts from the intended sleek and neat appearance.

While it is true that such boots are often provided with buttons and loops for holding the throat opening closed, this arrangement does not always keep the edges close together throughout the length of the throat opening, and many boots of this type are not provided with any such connecting means.

The object of the present invention is to provide a novel method of, and means for use in the practice of said method, whereby the material at the opposite edges of the throat opening is given such an initial set that the edges tend to remain in close contact without other assistance, whether or not fastener means be provided. In the attainment of this object, and in accordance with the invention, a retaining device, which may be referred to as a fork, is so arranged in the boot, while the latter is on the last and before the final curing, that the tines of the fork extend down into the folds at opposite sides of the throat opening. Since the tines of the fork are substantially parallel and close together, they hold the edges of the folds in substantial contact. This fork remains in place during the curing operation with the result that the material of the upper is set so that the opposite edges of the folds have a strong tendency to remain in contact when the boot is on display and not in use, even though fastener means is not used or though no fastener means be provided. The fork employed may have straight tines, or the tines may be curved to correspond to the shape of that part of the boot upper with which the fork is to be employed.

Other and further objects and advantages of the invention will be pointed out in the following more detailed description and by reference to the accompanying drawings, wherein—

FIG. 1 is a side elevation of an overshoe of the type in which the present invention is found useful;

FIG. 2 is a front elevation showing the folds at the opposite sides of the throat opening substantially in contact as is desirable when the boot is on display;

FIG. 3 is a fragmentary section to larger scale on the line 3—3 of FIG. 2;

Figure 4:
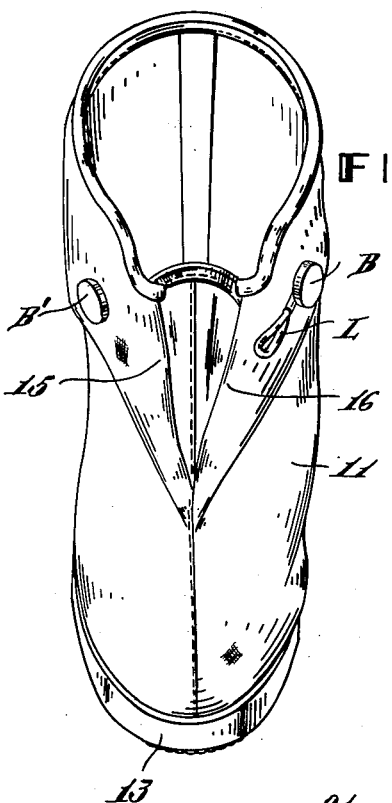
FIG. 4 is a front elevation similar to FIG. 2, but showing the opposite folds sagging apart.

Referring to the drawings, the numeral 10 indicates an overshoe of a conventional type wherein, for example, the upper 11 comprises textile material coated or impregnated with a waterproofing substance, for instance, a rubber compound, the shoe having an outersole 12 and, as illustrated herein, a foxing strip 13. This shoe has a throat opening 14 (FIG. 3) defined by folds 15 and 16, respectively, at which the material of the upper proper merges with material (which may be integral therewith or united thereto by seams) forming a bellows tongue or gore T of conventional construction.

The throat opening extends from the top edge of the shoe downwardly along the instep arch, as here illustrated, although in some shoes the throat opening is arranged at one side rather than at the front, the opening extending downwardly for a substantial distance so as to afford freedom for doffing or donning the boot. Because the material of the upper is usually soft and quite flexible, there is a tendency for the material of the upper, at opposite sides of the throat opening, to sag down, as illustrated in FIG. 4, so that the folds 15 and 16 spread apart, thus exhibiting a portion of the tongue T and seriously detracting from the desired neat appearance of the boot, particularly when it is on display in a shop window.

While, as here illustrated, it is quite common to provide such a boot with a button B to which there is attached a loop L designed to be engaged with a button B¹ at the opposite side of the throat opening, thereby to keep the opening closed, such an arrangement only keeps it closed through a portion of the length of the opening. Frequently, in displaying the boot, it may be desirable to leave the loop disconnected from the opposite button. In accordance with the present invention such sagging of the material at opposite sides of the throat opening is prevented (even though no fastener means be employed) by so setting the material forming the folds that the folds inherently tend to remain in close contact, as illustrated in FIG. 2.

For the practice of the present invention there is provided an implement 17 (FIG. 6), here illustrated as consisting of a length of stiffly resilient wire, for example, steel wire of the order of 8 American wire gauge, this length of wire being bent to form the U-shaped bend 18, disposed substantially at right angles to the length of the implement, and which constitutes a handle for use in manipulating the implement, and two substantially parallel legs 19 and 20, these legs being of a length substantially equal to the length of the throat opening in the boot, and being normally spaced apart a distance approximating twice the thickness of the material of the boot upper. The implement 17 illustrated in FIG. 6 has curved legs, as shown in FIG. 7, and is designed for use in a boot such as illustrated, where the throat opening is at the front.

Figure 5:
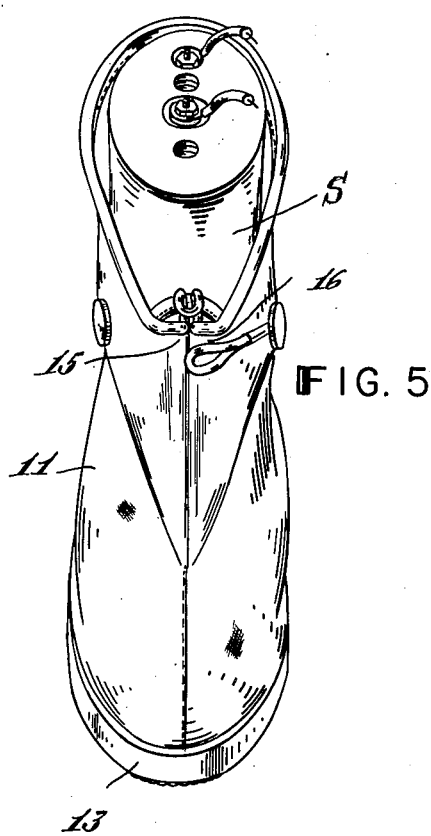
FIG. 5 is a front elevation showing the upper mounted on a last in readiness for the curing operation.

Either before or after assembling the upper with the last S (FIG. 5) preparatory to the union of the outersole with the innersole of the boot, the lower ends of the legs 19 and 20 of the implement 17 are spread apart slightly to facilitate their introduction into the folds 15 and 16 of the boot. Having introduced the tips of the legs 19 and 20 into the folds, the implement is then pushed downwardly, and in being moved downwardly and because of the close spacing of the legs, it draws the folds together so that their proximate surfaces are substantially in contact throughout the entire length of the throat opening. Assuming that the upper has been drawn over the last, that the implement 17 has been inserted, and that the lasted upper has been assembled with the outersole in a suitable mold, the last is heated and pressure is applied to unite the insole and outersole. It may be understood that up to the time that the upper is drawn over the last, the waterproofing material (whether in the form of a coating or impregnant of textile fabric or whether it, of itself, for instance a pliable plastic, constitutes the entire upper of the boot) is in a partially cured state, that is to say, it is still to a certain extent plastic. However, when heat and pressure are applied, this material is thereby completely cured. Being thus cured with the implement 17 within the folds 15 and 16, the material forming the folds takes a permanent set so that when the implement 17 is thereafter withdrawn and the boot removed from the last, the folds 15 and 16 tend to retain the shape imparted to them by the legs of the implement 17 and to remain in the relative position to which they were brought by the introduction of the legs 19 and 20 of the implement 17. In the completed boot, the folds tend to remain in the position shown in FIG. 2, whether or not any fastener elements be provided or employed. Thus the boot has a neat and pleasing appearance when exhibited in a shop window or when it is set aside between periods of use.

Figures 6, 7, 8:
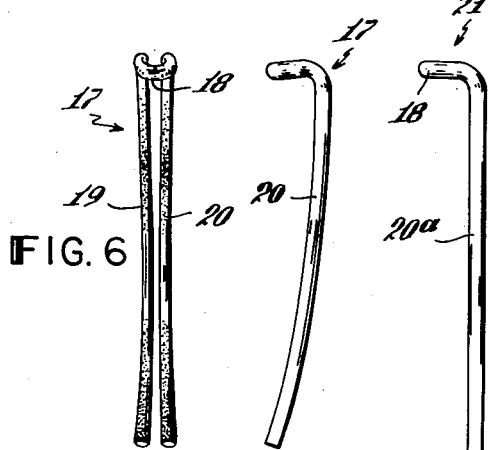
FIG. 6 is a front elevation of the fork employed in the present invention, this fork having curved legs.
FIG. 7 is a side elevation of the same fork.
FIG. 8 is a view similar to FIG. 6, but showing the fork with straight legs.

If the opening and bellows tongue be at the side, rather than at the front of the boot, the implement may have straight legs as illustrated, for example, in FIG. 8. Thus the implement 21 shown in FIG. 8, which also consists of a length of wire similar to that used in making the implement 17 and which also has the bend at 18 arranged to provide a useful handle in operating the implement, has legs, one of which is shown at 20a, which are substantially rectilinear.

While one desirable method of procedure has been specifically described herein, whereby the desired result may be attained, and likewise certain forms of implement for use in the practice of the method have also been shown and described, it is to be understood that the invention is broadly inclusive of any and all modifications, either as to method steps or in the implement used in the practice of the method such as fall within the terms of the appended claims.

I claim:

1. An implement for use in imparting a permanent set to folds of the upper material of an overshoe located at opposite sides of the throat opening of said overshoe, said implement being fork-like and having two substantially parallel legs integrally united at their upper ends by a U-shaped bend of implement material, said legs being of a size and shape adapted for insertion in said folds and being spaced apart a distance substantially twice the thickness of the upper material at said folds.

2. An implement according to claim 1, wherein the legs are integrally joined at their upper ends by a U-shaped bend which is substantially perpendicular to the legs and which constitutes a handle for manipulating the implement, said implement comprising a shaped wire.

References Cited in the file of this patent

UNITED STATES PATENTS

| | | |
|---|---|---|
| 1,382,649 | Joseph | June 28, 1921 |
| 1,892,791 | Taber | Jan. 3, 1933 |
| 1,976,365 | Ostling et al. | Oct. 9, 1934 |
| 2,903,724 | Doherty | Sept. 15, 1959 |